TESTING APPARATUS FOR INFORMATION STORAGE DEVICES

Filed Nov. 14, 1961 3 Sheets-Sheet 1

INVENTORS
JOHN BERNARD JAMES
BRIAN JOHN STEPTOE
BY Haune and Nydick
ATTORNEYS

Nov. 23, 1965 J. B. JAMES ETAL 3,219,922

TESTING APPARATUS FOR INFORMATION STORAGE DEVICES

Filed Nov. 14, 1961 3 Sheets-Sheet 2

INVENTORS
JOHN BERNARD JAMES
BRIAN JOHN STEPTOE
BY
Haseltine and Nydick
ATTORNEYS

TESTING APPARATUS FOR INFORMATION STORAGE DEVICES

INVENTORS
JOHN BERNARD JAMES
BRIAN JOHN STEPTOE
BY Kane and Nydick
ATTORNEYS

United States Patent Office 3,219,922 Patented Nov. 23, 1965

3,219,922

TESTING APPARATUS FOR INFORMATION STORAGE DEVICES

John Bernard James, Stevenage, and Brian John Steptoe, Hitchin, England, assignors to International Computers and Tabulators Limited Filed Nov. 14, 1961, Ser. No. 152,337
Claims priority, application Great Britain, Dec. 30, 1960, 44,763/60
9 Claims. (Cl. 324—34)

Figure 1:
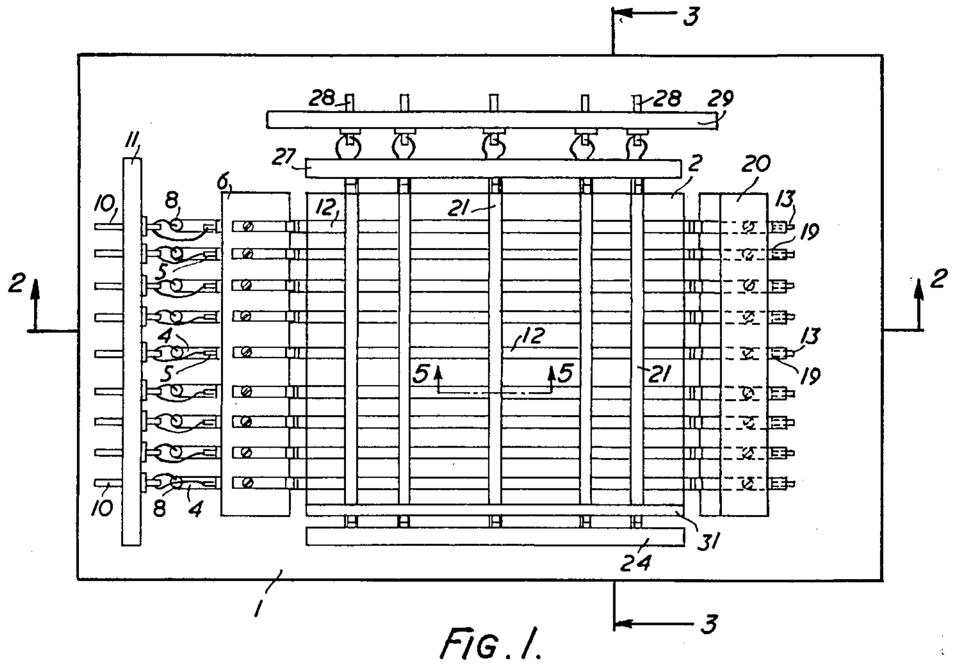

The present invention relates to apparatus for testing characteristics of thin magnetic data storage films supported on plate-like substrates.

It has been proposed to provide data storage arrangements employing areas of anisotropic magnetic film deposited on supporting substrates. Such areas may each be switched to one or the other of two opposite stable residual magnetic states by the application of suitable switching currents to conductors lying closely adjacent to the film face. Data items are stored by switching selected areas of the film each to a predetermined one of these stable states and a stored item may be read out for example, by resetting the corresponding area of film to the opposite state, a signal being induced in a pick-up conductor as the area is reset.

Each elementary area may be a separate spot of film or it may be an area forming part of a continuous film. Thus a single substrate may support a large number of such areas and it is convenient to arrange these areas into a matrix formation of rows and columns and to arrange the associated conductors along these rows and columns.

Because the output signals from thin film storage devices of this kind are very small, it is essential that the conductors are applied very closely to the film surface and since these storage devices are usually operated at high speeds it is usual for the conductors to take the form of thin strips. These strips are commonly applied to the face of the film by printed circuit techniques, for example, or by sticking a preformed matrix of conductors to the film face.

The characteristics of the film, however, are subject to variations over the area of the substrate and it is therefore necessary to test the storage plates after manufacture to ensure the selection of only those whose characteristics are satisfactory in all the elementary areas. However, in order to test the plates under operational conditions it is necessary to provide the driving and pick-up conductors closely adjacent to the surface of the film. Ideally, the conductors used for testing are those which are to be used for controlling the film in the final storage device. However, since the plates are to be tested individually this means that a large number of connections are required to be made to each plate before testing may take place. In a preferred form of storage device, moreover, the large number of inter-plate connections which would otherwise be necessary are reduced by making certain conductors continuous from plate to plate in the completed storage device. Thus, in order to avoid the inclusion of an unsatisfactory plate in the storage device and the associated wastage in affixing conductors to the unsatisfactory plate it is clearly advantageous to test the storage plates before the application of the necessary conductors.

It is an object of the invention to provide apparatus for testing characteristics of elementary areas of a thin magnetic film supported on a substrate before the final application of switching and pick-up conductors to the face of the film.

It is a further object of the invention to provide a testing jig for holding a magnetic storage film supported by a substrate in closely spaced relationship to a pattern of driving and pick-up conductors for testing purposes.

According to one aspect of the present invention, apparatus for testing the response characteristics of elementary areas of a thin anisotropic magnetic storage film having two stable states and supported on a substrate includes an arrangement of intersecting groups of driving and pick-up conductors, means for locating the substrate with respect to the conductor arrangement, each intersection in the conductor arrangement defining an elementary area of the film, means for pressing the film and the conductors into closely spaced relationship, means for applying driving signals to the groups of driving conductors to change the states of said elementary areas and means for registering output generated in the group of pick-up conductors in response to said changes of state.

According to another aspect of the invention, where the film is supported on a planar substrate, the testing apparatus includes a planar arrangement of conductors which arrangement includes a first group of parallel drive conductors, a second group of parallel drive conductors intersecting the first group and a group of pick-up conductors, a pick-up conductor lying parallel to each drive conductor of one group; means for locating the substrate with respect to the conductor arrangement each intersection of the driving conductors in the two groups defining an elementary area of the film, means for pressing the film and the conductor arrangement into closely spaced relationship to couple the conductors to the film, means for applying driving signals to the driving conductors to select an elementary area to be driven and means for registering resultant output signals induced in that pick-up conductor coupled with the selected elementary area in response to changes of state of said selected element.

Each elementary area of the film may be selected in turn and driven by a programmed pattern of driving signals. The selection of the areas and the selection of the driving signal pattern may be performed by recirculating stepping registers.

According to a further aspect of the invention, apparatus for testing thin ferromagnetic films supported on planar substrates includes a testing jig having a support block with grooves formed in one surface, a pattern of conductors laid in the grooves, said conductors being insulated from each other and from the bed plate, a planar layer of insulation over the surface and the conductors, means for locating a substrate supporting a film to be tested within the jig in a predetermined position with respect to the conductor pattern, means for exerting pressure on said substrate to bring the film to be tested into close proximity to the conductor pattern, means for connecting some of said conductors to a source of driving signals and means for connecting others of said conductors to an output registering device.

Figure 2:
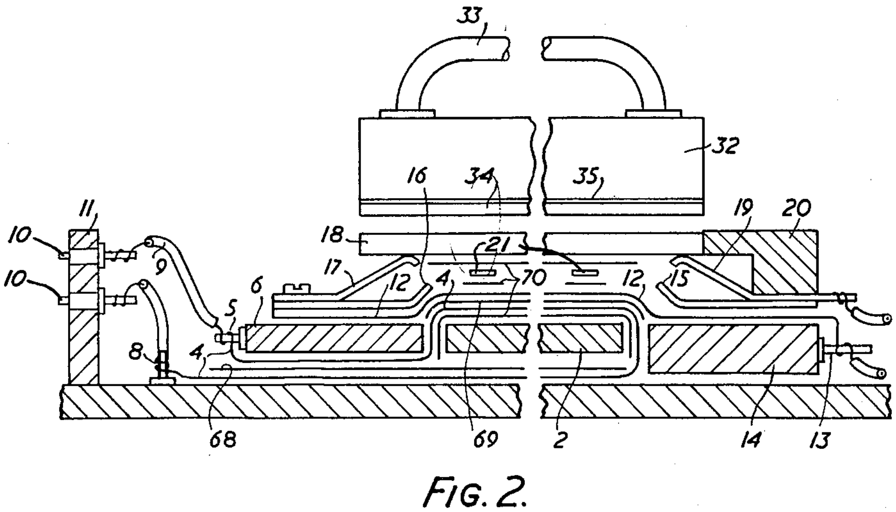
Figure 3:
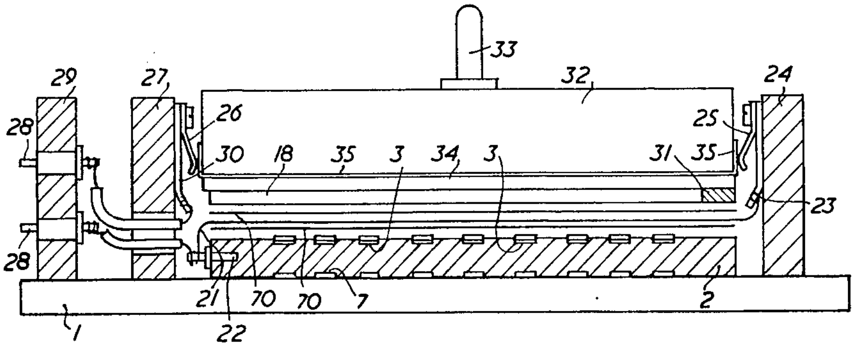
Figure 4:
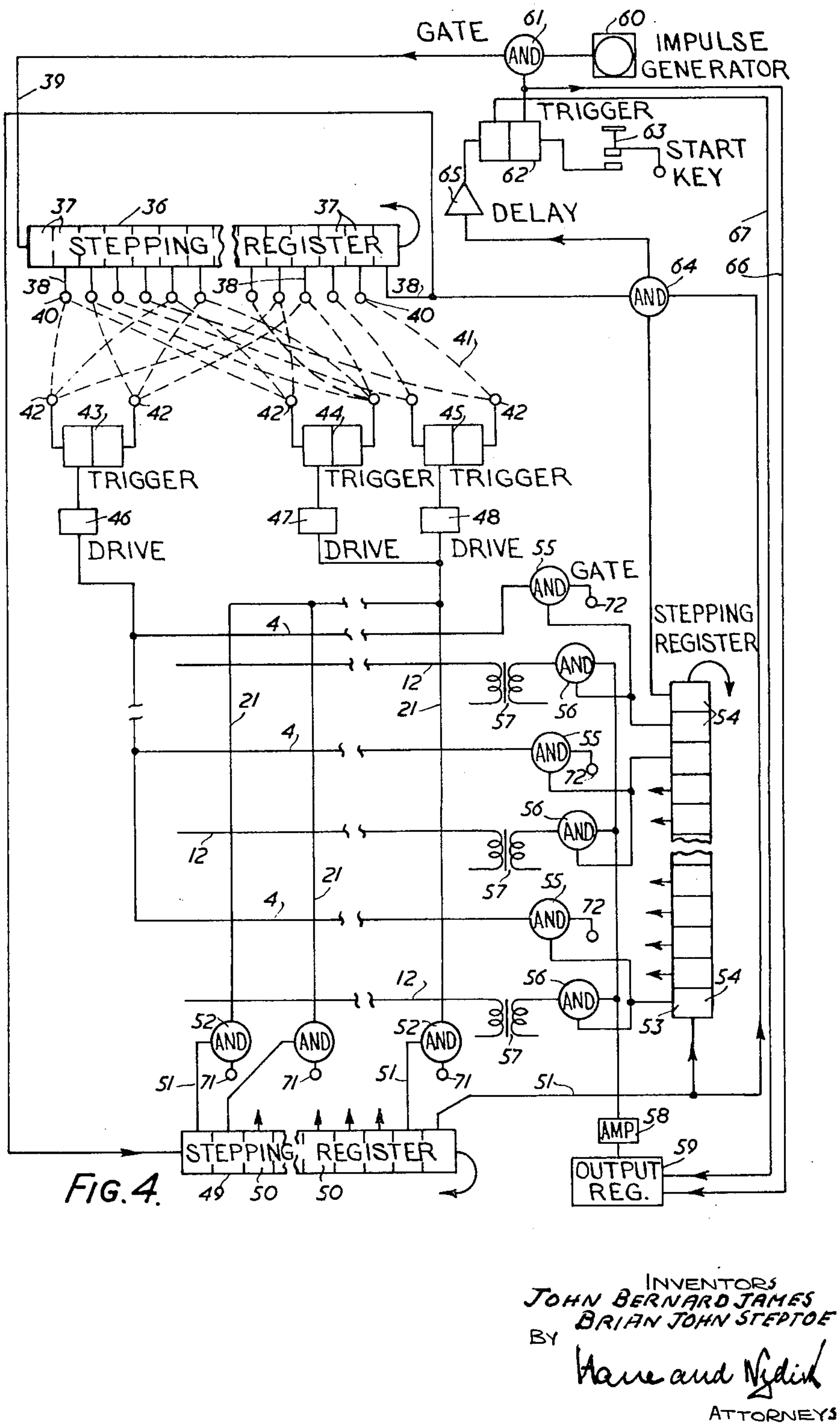

Apparatus embodying the present invention will now be described with reference to the accompanying drawings, in which, FIGURE 1 is a plan view of the bed of a testing device, FIGURE 2 is a partial sectional view of the testing device taken along the length of the bed on the line 2—2 of FIGURE 1, FIGURE 3 is a partial sectional view of the testing device taken across the width of the bed on the line 3—3 of FIGURE 1, and FIGURE 4 is a block schematic diagram of the circuit connections of the testing device.

Figure 5:
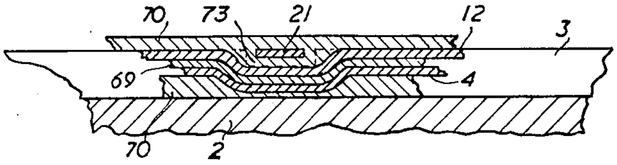

FIGURE 5 is a partial sectional view taken along line 5—5 of FIGURE 1.

The testing apparatus to be described includes a testing jig for holding a plate-like substrate carrying a thin magnetic storage film closely adjacent to a pattern of driving and pick-up conductors and also includes apparatus for driving areas of the film and for registering resultant outputs. The testing jig will first be described.

This part of the apparatus, as shown in FIGURES 1, 2, 3 and 5, consists of a main base 1 upon which is mounted a plate support block 2. The upper surface of the support block 2 carries mutually perpendicular groups of parallel grooves 3 and 73 to accommodate strip conductors.

It will be understood that the grooves 3 are sufficiently deep so that the block 2 presents a flat surface to support a plate to be tested, as indicated in FIGURE 5. However, for the sake of clarity, FIGURES 2 and 3 show the conductors spaced away from the block 2 and other component parts spaced apart in order that the paths followed by the conductors may more easily be traced. Further, although it will be appreciated that in order to test all the elementary areas of a storage film, lateral spacing of the conductors will be such that sufficient conductors are provided in each direction for this purpose, FIGURES 1 to 3 show only a small number of conductors in each direction for the sake of clarity.

Three groups of conductors are provided and the paths followed by the conductors of each of these groups will now be described.

The first group consists of drive conductors 4 passing lengthwise along the block 2. As shown in FIGURE 2, one end of each of these conductors 4 is connected to a terminal 5 set in a terminal block 6. The conductor 4 passes under the block 6 and is then carried upwards to the appropriate groove 3 in the upper face of the support block 2. The conductor 4 passes along this groove and is turned downwards at the far end of the block 2 and passes back in a similar groove 7 in the underside of the block to a second terminal 8 carried by the base 1. A strip of insulating material 68 is interleaved between the ends of the conductor 4 under the terminal block 6 and this insulation is generally indicated, spaced away from the conductor 4 for the sake of clarity, in FIGURE 2. The base 1 of the testing jig is preferably of insulating material. However, this is not essential although it will be appreciated that if the base is made of conducting material, a layer of insulating material is interposed between the conductors 4 and the base 1. Similarly terminal blocks, such as 6 used in the testing jig are also preferably made of an insulating material although conductive materials may be used for this purpose provided that the conductors and terminations at such blocks are insulated from the blocks in conventional manner.

The ends of the conductor 4 are connected by means of wires 9 to an output group of terminals 10 mounted in a terminal block 11 supported on the base 1.

The second group of conductors 12, termed sense conductors, also pass across the face of the block 2 in the same grooves 3 as the first group. One end of each of the sense conductors 12 is connected to a terminal 13 mounted in a terminal block 14. Each conductor 12 then passes beneath a guide 15 and into the appropriate groove 3 of the block 2. A layer of insulating material 69 is interleaved between the two conductors in each groove 3. The insulation 69 is indicated schematically in FIGURE 2 and is shown more clearly in FIGURE 5. It will be appreciated, however, that FIGURE 5, which is a partial sectional view taken along the line A—A of FIGURE 1, is intended to show the relative dispositions of the conductors and associated insulation within the grooves 3 of the block 2 and should not be regarded as being true to scale. Each sense conductor 12 passes across the block 2 and is terminated by soldering to a further guide 16 at the terminal block 6.

A contact spring 17 is clamped to the guide 16 and projects upwards to make contact with the plate 18 to be tested when this is inserted into the tester. Thus the plate 18 forms a common return path for all the sense conductors 12. Further contact springs 19 are provided at the opposite end of the bed and these springs overlie the guides 15. The springs 19 provide the second termination for each of the sense conductors. The springs 19 and the guides 15 are clamped together to the terminal block 14 by a strip 20 which also acts as a locating strip for one end of the storage plate to be tested.

The third group of conductors consists of drive conductors 21 passing across the block 2 at right angles to the other two groups, and the arrangement of the conductors 21 is shown most clearly in FIGURE 3. One end of each of these conductors is connected to a terminal 22 mounted in one edge of the block 2. The conductors 21 then pass across the face of the block and are terminated on a strip 23 mounted on a block 24. Each terminal strip 23 has an associated contact spring 25 projecting inwardly from the block 24 and a corresponding contact spring 26 is provided on a block 27 on the opposite side of the bed. Pairs of output terminals 28 are provided in a further terminal block 29 and these terminals are connected respectively to the terminals 22 and, by means of strips 30, to the springs 26. In order to describe the manner in which the terminals 28 are connected to both ends of the drive conductors 21 it is first necessary to consider the loading of a storage plate to be tested into the testing bed. A further locating strip 31 for the plate is provided along one edge of the block 2 as shown in FIGURES 1 and 3. Each storage plate 18 (FIGURES 2 and 3) consists of a nonmagnetic electrically conductive substrate upon which the magnetic storage film is deposited. A plate is laid upon the block 2 with the film to be tested faced towards the block. The plate is laterally adjusted so that two edges abut the locating strips 20 and 31. In practice it is usual to leave an area of the substrate free from the film in order that the plate may later be supported in a storage apparatus. This is desirable in order that the film is not stressed by the supporting device which may for example, be a clamping strip or a group of fixing screws. In the present case the film-free area is a strip at each end of the plate and the contact springs 17 and 19 are disposed so that they make contact with the substrate in those strips. It will be appreciated, however, that the film may extend to the extreme edges of the plate and in this case the film itself provides the common return path for the sense conductors.

In a preferred form of construction the block 2 is metal and, as shown in FIGURE 5, in order to isolate the conductors 4, 12 and 21 from the block, the conductors are separated from the bottom and sides of the block by insulation 70. The insulation 70 is also extended as a thin layer over the surface of the block and performs the dual function of insulating the conductors and the block from the face of the film and also providing a planar surface upon which the film may be pressed without distortion and consequent stress. While the insulation is shown in FIGURE 5 as homogeneous it will be appreciated that it may be deposited as a succession of thin layers or strips during the process of laying the conductors in the grooves.

When the plate 18 supporting the film to be tested has been correctly aligned in the jig, a weight having a main body 32 and provided with a convenient handle 33, is laid upon it. This weight ensures that the plate 18 is pressed into closely spaced relationship with the conductor groups carried by the block 2.

The body of the weight is preferably of metal and an insulating layer 34 is provided over the underside of the weight. The contact springs 25 and 26 associated with the third group of conductors are positioned so that they make contact with the sides of the weight. Thus the weight provides a common return path for the conductors of the third group. It is preferred, in order to reduce circuit resistance, to plate the lower part of the weight with a tarnish resistant metallic coating 35, such as gold, for example, at least in the area where the springs 25 and 26 make contact.

The function of the weight is to press the plate 18 into close contact with the block 2, and it will be appreciated that a thinner pressure plate may alternatively be used, the necessary pressure being obtained, for example, by the provision of a compression spring applied to the upper surface of the pressure plate.

In the preceding description it has been assumed that the substrate of the plate 18 is an electrically conductive material. In the case where a non-conductive material is used, such as glass, for example, the arrangement may be modified to provide an alternative return path for the sense conductors 12. A further conductive layer may then be applied to the underside of the insulating layer 34 carried by the weight 32. The weight is then modified so that it projects beyond the edges of the plate 18 as shown in FIGURE 2. The contact springs 17 and 19 are re-positioned so that they contact the projecting face of the lowermost layer carried by the weight, suitable slots being provided in the locating strip 20 for the contact springs 19. The height of the strip 20 is also reduced so that it does not project above the upper face of the plate 18 and, finally, a further locating strip may be provided on the strip 20 to correctly locate the weight. Hence, in this case the return path for the sense conductors is provided by the lowermost layer on the weight.

FIGURE 4 shows, in block schematic form, a circuit suitable for controlling the application of drive currents to the conductors 4 and 21 and registering resultant outputs induced into the sense conductors 12. The conductors 4, 12 and 21 are represented in FIGURE 4 as single lines for the sake of clarity but it will be appreciated that they all form loops in the manner previously described. Furthermore only three of each of these conductors are shown in the figure but it will be obvious that as many conductors are provided in each group as are necessary to provide access to all the elementary film areas to be tested.

It is desirable to test each elementary area not merely by storing a single data item and then reading out the stored item but by applying a pattern of testing signals to it. For example, since the film has two stable states it is usual to store a binary information item in each elementary area. The area is set to one state to represent a binary one and is set to the opposite state to represent a binary zero. The pattern of testing signals applied to each elementary area may then represent the binary succession 00110, for example, in order to test the response of the area to the storage of successive like and unlike data items. It is assumed that this pattern of signals is to be applied to each elementary area in turn and the arrangement shown in FIGURE 4 controls the selection of these elementary areas for the application of the testing signal pattern.

A recirculating stepping register 36 has a number of stages 37 and is arranged to apply an output signal in turn to each of a number of output lines 38 in response to the application of stepping control signals over an input line 39. Each of the stages 37 may for example, be a bistable trigger stage, one of the stages being set to one state and the remainder being set to the opposite state. The register 36 may then be arranged in the conventional manner as a shift register, the line 39 being connected as the shift pulse control line to the register to cause the set state to be stepped along from stage to stage. It is preferred to omit the output line 38 from the first stage 37 of the register 36 in order to provide an initial position in each testing cycle in which position the testing arrangements are effectively rendered inoperative. Since, as will be described, the testing circuits perform a complete testing cycle automatically, this initial position is the nominal starting and ending position of a cycle and the substrates to be tested in the jig are normally charged while the apparatus is in this condition.

Each output line 38 except those of the first and final stages is connected to a separate socket 40. Pluggable connections 41 are provided between the sockets 40 and sockets 42 which are respectively connected as setting and unsetting inputs to three trigger stages 43 to 45. These trigger stages control the drive circuits 46 to 48 for the conductors 4 and 21 in a manner to be described hereinafter.

The output line 38 of the final stage 37 of the register 36 is connected to the stepping control input of a further stepping register 49, the stages 50 of which are generally similar to those of the register 36. The register 49 has a number of stages 50, one associated with each of the drive conductors 21 and a further final stage. Output lines 51 from each of the stages 50 except the last are connected to control AND gates 52 which are opened in turn by the output signals from the register to allow the associated conductors 21 to carry drive currents. Thus each conductor 21 is in turn allowed to carry a signal pattern.

The output line 51 of the final stage 50 of the register 49 is connected to the stepping control input of another stepping register 53, generally similar to register 36 and having a number of stages 54. Each stage 54 except the last is connected to a pair of AND gates 55 and 56. The AND gates 55 are each connected to one of the conductors 4 and are opened by output signals from the register 53 to allow the conductors 4 to carry drive signals in turn.

The conductors 12 are connected through step-up transformers 57 to the AND gates 56 so that as each drive conductor is selected the associated pick-up conductor 12 is also selected by the opening of the appropriate AND gate 56.

Opening of the AND gate 56 then allows output signals induced in the corresponding conductor 12 to pass to an amplifier 58 and then to a registering device 59 such as a pen recorder or an oscilloscope, for example.

Thus the stepping registers 37, 49 and 53 are interconnected in the following manner. The register 37 determines a pattern of driving signals to be passed in turn to each elementary area and at the conclusion of a complete driving signal pattern it passes a signal to the registers 49 and 53 to select a new area for testing. The register 49 first allows the selection of each elementary area in turn associated with a single drive conductor 4 and when all these areas have been selected it passes a signal to the register 53 to select another drive conductor 4.

The impulses for shifting the registers are derived over the line 39 from an impulse generator 60 through an AND gate 61. The gate 61 is controlled by a bistable trigger 62. In its normal state the trigger 62 maintains the gate 61 closed. Manually controlled contacts 63 are provided and closure of these contacts switches the trigger 62 to the opposite state to open the gate 61. Opening of the gate 61 allows the shifting signals to pass to the stepping register 37. At the conclusion of the testing of all the elementary areas of the film all the registers 37, 49 and 53 are stepped to their final stages. The final stages of all these registers are connected to an AND gate 64 and a resultant output signal from this gate is applied through a delay element 65 to unset the trigger 62, thereby restoring the circuit to its original state. The delay provided by the delay unit 65 is arranged to be sufficient to allow all the registers 37, 49 and 53 to step to their first stages in readiness for a new testing cycle. It will be appreciated that the final stages of the registers 36, 49 and 53 may be omitted and the inputs to the AND gate 64 taken directly from the last selecting stages of these registers. In this case, provided that the switching time of the trigger 62 is compatible with the transfer time of the registers, the delay unit 65 is unnecessary.

In order to control the registering device 59, start and stop lines 66 and 67 respectively, are provided from the outputs of the trigger 62. It will be appreciated that additional control and timing markers may be registered by the registering device 59 by the provision of suitably amplified outputs from predetermined stages of the registers 49 and 53.

The particular pattern of signals applied to each of the elementary areas of the film is determined by the manner in which the pluggable connections 41 are made between the sockets 40 and 42. The manner in which these pluggable connections is made is, however not solely dependent upon the required storage pattern but also depends upon the mode in which the elementary areas are to be operated. A number of modes of operation of thin film areas for storing binary coded data are described in an article entitled "Magnetic Film Memory Design" by J. I. Raffel et al., in the Proceedings of the I.R.E. for January 1961, and one example of a particular mode of operation is more fully described in United States patent application No. 118,561 (filed on June 21, 1961 by Edward M. Bradley et al.), in which binary representations are stored in an area by the energization of so-called word and digit drive conductors intersecting at the area.

This mode of operation may be applied to the elementary areas at present under consideration, the drive conductors 4 corresponding to the digit drive conductor and the drive conductors 21 corresponding to the word drive conductors. In order to store a binary zero it is required to energize the appropriate word conductors 21 by a drive current in a first direction concurrently with the energization of the appropriate digit drive conductor 4. To store a binary one it is required to energize only the appropriate word drive conductor by a drive current in the first direction. To read out the stored information it is required to energize the word drive conductor by a current in the opposite direction. Hence to perform the operation of storing and reading in this mode it is necessary to provide a digit drive generator and two word drive generators arranged to generate driving currents in opposite directions.

The article in the Proceedings of the I.R.E. referred to above describes reading and writing operations on a film area which involve the provision of bi-directional driving current generators. For example, in one mode of operation it is proposed to provide a zero drive consisting of a permanent bias current in one direction and to superimpose upon this a reversed one drive current of twice the magnitude, thus effectively providing a bi-directional drive. The article also shows and describes suitable driving and reading amplifier circuits, the driving current generator being responsive to an input signal to produce a driving current over a two-wire output, one wire of the output being effectively the supply wire for the driving current and the other being a return wire. As described with reference to FIGURES 1 and 3, the conductors 21 of the testing jig have a common return path. However, as shown in FIGURE 4, the ends of the conductors 21 connected to the drive current generators 47 and 48 are commoned while the other ends of these conductors are selected by means of the gates 52. Hence, in order to use drive current generators having a two-wire output, it will be realised that the common return path of the conductors 21 is preferably connected to the supply wire of the output and the gates 52 are connected between the individual conductors 21 and the common return wire of the output, indicated in FIGURE 4 by reference 71. In much the same way, the drive conductors 4 are connected by gates 55 between the drive current generator 46 and a common return 72. It will be appreciated that since the conductors 4 have no common return path, they are connected in circuit such that the direction of current flow is compatible with the current flowing in the conductors 21.

The drive circuit 46 generates the digit drive current and is turned on to provide the current by the setting of trigger 43 in response to a signal from one of the associated sockets 42. The other of these sockets 42 resets the trigger 43 which, in turn, turns off the digit drive current generator 46.

The two driving circuits 47 and 48 are word current generators controlled in a similar way by the triggers 44 and 45 respectively. The driver 47 generates a driving current in one direction and the driver 48 generates a driving current in the opposite direction.

The pluggable connections necessary to apply the test pattern 00110 to the elementary areas using the mode of operation outlined above are now apparent.

The first socket 40 associated with the output line 38 of the second stage 37 is connected by a connector 41 to the socket 42 associated with the "turn-on" input to the trigger 43. The same socket 40 is also connected to the "turn-on" input of trigger 44. This plugging causes both drivers 46 and 47 to be operated to permit digit and word currents to flow in the drive conductors of the matrix.

The second socket 40 of the register 36 is connected to the "turn-off" inputs of both triggers 43 and 44 and the drive currents are turned off.

These operations have caused a representation of binary zero to be stored in the selected elementary area.

The third socket 40 is connected to the "turn-on" input of trigger 45 to permit a reverse word current to flow and the fourth socket 40 is connected to the "turn-off" input of the trigger.

This is the read-out signal to cause the stored representation to be read out of the area.

The fifth and sixth sockets 40 are connected in the same way as the first and second respectively to store a binary zero.

The seventh socket 40 is connected only to the "turn-on" input of trigger 44 and eighth socket 40 is connected to the corresponding "turn-off" input. These connections cause a binary one to be stored.

The ninth and tenth sockets are connected to read out the stored signal in the same way as the third and fourth sockets.

The eleventh and twelfth sockets are again connected in the same way as the seventh and eighth to store a binary one.

The thirteenth and fourteenth sockets are connected in the same way as the first and second to store a binary zero.

Finally the fifteenth and sixteenth sockets are connected as are the third and fourth to read out the stored signal.

Since the read-out signals are to be registered it is useful to prevent the registration of signals induced into the pick-up conductors 12 during the switching of the area while the driving currents are applied during entry of information. For this purpose the amplifier 58 may include a signal gate and this gate may then be strobed under control of a further trigger (not shown). This strobe control trigger is set and unset by pluggable connections (not shown) in parallel with the trigger 45 during a read-out operation.

In the foregoing description the word and drive currents are applied simultaneously by the setting of the triggers 43 and 44 from the same stage 37 of the register 36. However, if it is required to ensure that, for example, the digit drive current is always applied before the word drive current, then the plugging may be arranged so that the trigger 43 is set on by one stage and the trigger 44 is set on by the following stage. Similar rearrangements may also be used to ensure, for example that one drive current is removed before another. These rearrangements will, of course require the provision of additional stages 37 in the register 36.

The preceding descriptions also assume that the recording device 59 is capable of a speed of operation compatible with the speed of operation at which the storage plate is to be tested. However, the operating speed of the store may very well greatly exceed that of the recording device. In order to enable the store to be tested at its greater operating speed the pluggable connections may be rearranged so that, for example, adjacent stages may be used for actual switching operations on the store while a number of stages may then be left unplugged to allow sufficient time for the slower operation of the gating arrangements and of the recording device. This rearrangement again requires an additional number of register stages.

It will be appreciated therefore that although the register 36 has been described as having seventeen stages, the minimum number provided depends upon the pattern of storage and readout signals to be applied to each area and also on the manner in which these signals are to be applied. A register having a greater number of stages than are required for any given pattern may also be used, the remaining stages being left unplugged. The plugging arrangement between the register 36 and the triggers 43 to 45 forms a programming device to allow the test pattern to be varied according to the response to be tested and any particular pick-up signal may be examined during the application of the test pattern by appropriate plugging of the strobe control trigger referred to earlier.

The apparatus may be modified to allow the elementary areas of film to be operated according to other modes. For example, the United States patent application No. 118,561 noted above, also refers to a mode of operation requiring bi-directional digit drive currents as well as bi-directional word drive currents.

Operation in this mode may be obtained by providing an additional digit drive current generator and its associated control trigger. Similarly, a mode of operation requiring only unidirectional drive currents may also be used by omitting or leaving unplugged, any drive current generator which is not required. Obviously, in cases where a standard pattern of testing signals only is required, connections between the stages 37 of the register 36 and the driving current control triggers 43 to 45 may be permanently wired instead of being formed by the plugs and sockets 40 to 42 shown.

Apparatus described in the foregoing paragraphs uses control triggers 43 to 45 which are set and unset to turn on and turn off the drive currents to the drive conductors. It will be appreciated that by setting one of these triggers in response to the output from one stage 37 of the register 36 and subsequently unsetting the trigger by the output of the *n*th stage later, the duration of the driving current will equal the time taken to shift the signal in the register 36 by *n* stages. This allows the duration of the drive currents applied to the film areas to be controlled as well as allowing the overlapping of drive currents referred to above. It will be appreciated, however, that in cases operating in a simpler single-drive current mode the control triggers may be omitted by adjusting the repetition frequency of the generator 60 so that the time taken for the signal in register 36 to step from one stage 37 to the next is equal to the required drive current duration. In this case the output pulses from the stages 37 may be applied directly to control the drive current generators, such as 46. For example, suitable generators for supplying bi-directional driving currents in response to single pulses, suitable for this purpose, are described in an article entitled "Electrical Readout From Thin Ferromagnetic Films," by S. Feinstein and H. J. Weber, published in "Electronics" for July 29, 1960. Alternatively, control triggers may be retained and the need for an unsetting input avoided by using monostable triggers having a restoration time delay equal to the required drive current duration.

FIGURE 4 shows a read-out system in which the resultant signals induced in the pick-up conductors 12 are connected by step-up transformers 57 through the gate 56 to a common output amplifier 58. It will be realized, however, that in many cases it will be preferred to provide separate read-out amplifiers, such as that shown in the Proceedings of the I.R.E. article referred to above, for each conductor 12 and gate the amplifier outputs directly to the output registering device 59.

We claim:

1. Apparatus for testing characteristics of an anisotropic magnetic thin film, including a conductor assembly comprising a group of pick-up conductors, a first group of driving conductors and a second group of driving conductors intersecting said first group; means to locate the film to be tested relative to said conductor assembly; pressure exerting means for pressing the film and the conductor assembly into close relationship; means to apply driving signals to a selected conductor of said first group and a selected conductor of said second group to change the direction of magnetization of that portion of said film which lies adjacent the intersection of said selected conductors; and means to register an output signal generated in one of said pick-up conductors in response to the change of direction of magnetization of said portion.

2. Apparatus for testing characteristics of an anisotropic magnetic thin film mounted on a planar substrate, including a conductor assembly comprising a first group of parallel driving conductors, a second group of parallel driving conductors intersecting said first group, and a group of pick-up conductors parallel to one of said groups of driving conductors; means to position the conductor assembly relative to the substrate with the conductors adjacent one surface of the film to be tested; pressure exerting means to press the substrate and the conductor assembly into closely-spaced relationship to couple the conductors magnetically to the film; means to apply driving signals to a selected conductor of said first group and a selected conductor of said second group to change the direction of magnetization of that portion of the film which is magnetically coupled to both said selected conductors; and means to register an output signal generated in the pick-up conductor coupled to said portion in response to the change of direction of magnetization of said portion.

3. Apparatus for testing characteristics of an anisotropic magnetic thin film mounted on a planar substrate, including a support block having a plurality of grooves formed in one surface; a conductor assembly comprising a group of pick-up conductors, a first group of driving conductors, and a second group of driving conductors intersecting said first group, said conductors being mounted in the grooves and being insulated from each other and from the support block; means to locate the substrate relative to the support block with the film to be tested in a predetermined position with respect to the conductor assembly; pressure exerting means to press the substrate and the support block into closely-spaced relationship to couple the conductors magnetically to the film; means to apply driving signals to a selected conductor of said first group and a selected conductor of said second group to change the direction of magnetization of that portion of the film which is magnetically coupled to both said selected conductors; and means to register an output signal generated in the pick-up conductor coupled to said portion in response to the change in direction of magnetization of said portion.

4. Apparatus for testing characteristics of an anisotropic magnetic thin film mounted on a planar substrate, including a support block having a plurality of grooves formed in one surface; a conductor assembly comprising a group of pick-up conductors, a first group of driving conductors, and a second group of driving conductors intersecting said first group, said conductors being mounted in the grooves and being insulated from each other and from the support block; means to locate the substrate relative to the support block with the film to be tested in a predetermined position with respect to the conductor assembly; pressure exerting means to press the substrate and the support block into closely-spaced relationship to couple the conductors magnetically to the film; means to apply driving signals to selected pairs of driving conductors, each pair comprising one conductor from each of said first and second groups, in turn in accordance with a predetermined program to change the direction of magnetization of those portions of the film which are magnetically coupled, respectively, to said selected pairs of conductors; and means to register in turn output signals generated in the pick-up conductors coupled, respectively, to said portions in response to the change of direction of magnetization of said portions.

5. Apparatus for testing characteristics of an anisotropic magnetic thin film mounted on a planar substrate, including a support block having a plurality of grooves formed in one surface; a conductor assembly comprising a group of pick-up conductors, a first group of driving conductors, and a second group of driving conductors intersecting said first group, said conductors being mounted in the grooves and being insulated from each other and from the support block; means to locate the substrate relative to the support block with the film to be tested in a predetermined position with respect to the conductor assembly; pressure exerting means to press the substrate and the support block into closely-spaced relationship to couple the conductors magnetically to the film; a first driving current generator operable to apply driving signals to the conductors of said first group; a second driving current generator operable to apply driving signals to the conductors of said second group; a first recirculating stepping register operative to cause said first and second current generators to apply a pattern of driving signals to selected ones of said driving conductors to change the direction of magnetization of portions of the film; and means to register output signals generated in the pick-up conductors in response to the change of direction of magnetization of said portions.

6. Apparatus according to claim 5, wherein there are provided a plurality of first gating devices connected, respectively, to the conductors of said first group; a second recirculating stepping register having a succession of stages each connected, respectively, to one of said first gating devices and being operative to open said first gating devices in turn to select the conductors of said first group for application thereto of the pattern of driving signals; and means to advance said second register by one stage for each complete circulation of said first register.

7. Apparatus according to claim 6, wherein there are provided a plurality of second gating devices connected, respectively, to the conductors of said second group; a plurality of third gating devices connected, respectively, to said pick-up conductors; and a third stepping register having a succession of stages each connected, respectively, to one of said second gating devices and to one of said third gating devices, said third register being operative to open said second gating devices in turn to select the conductors of the second group for application thereto of the pattern of driving signals, and being operative to open said third gating devices in turn to feed the output signals generated in the pick-up conductors in turn to the output signal registering means, said third register being advanced by one stage for each complete circulation of said second register.

8. Apparatus according to claim 3, wherein there is a common return path for one of said groups of conductors, said path being provided by the pressure exerting means.

9. Apparatus according to claim 3, wherein there are provided contact members connected to the conductors of one of said groups and arranged to contact the film to be tested, the film thereby providing a common return path for said conductors.

References Cited by the Examiner

UNITED STATES PATENTS

| | | | |
|---|---|---|---|
| 3,009,109 | 11/1961 | Jankowski | 324—158 |
| 3,016,489 | 1/1962 | Briggs | 324—158 |
| 3,037,199 | 5/1962 | Grant | 340—174 |
| 3,076,958 | 2/1963 | Pohm | 340—174 |

RICHARD B. WILKINSON, *Primary Examiner.*

WALTER L. CARLSON, F. SEEMAR, *Assistant Examiners.*